United States Patent [19]

Stern et al.

[11] Patent Number: 5,424,466
[45] Date of Patent: Jun. 13, 1995

[54] IMPROVED PROCESS FOR THE PRODUCTION OF ESTERS FROM FATTY SUBSTANCES HAVING A NATURAL ORIGIN

[75] Inventors: Robert Stern, Paris; Gerard Hillion, Herblay; Jean-Jacques Rouxel, Vigny, all of France

[73] Assignee: Institut Francais du Petrole, Rueil-Malmaison, France

[21] Appl. No.: 125,824

[22] Filed: Sep. 24, 1993

[30] Foreign Application Priority Data

Sep. 25, 1992 [FR] France .................. 92 11572

[51] Int. Cl.$^6$ .................................... C11B 3/10
[52] U.S. Cl. .......................... 554/175; 554/179
[58] Field of Search ........................ 554/175, 179

[56] References Cited

U.S. PATENT DOCUMENTS 3,816,485  6/1974  Wechsler .................. 554/174
4,695,411  9/1987  Stern et al. ............... 554/175

FOREIGN PATENT DOCUMENTS 578751  10/1946  United Kingdom .

OTHER PUBLICATIONS

Lago et al., "Extraction and Transesterification of Vegetable Oils with Ethanol," *Oleagineux*, vol. 40, No. 3, 1985, pp. 147–151.

Stage, "Principle of the New ATT-Process for Converting Vegetable Oils to Diesel Fuels," *Fat Science Technology*, vol. 90, No. 1, 1988, pp. 28–32.

*Primary Examiner*—José G. Dees
*Assistant Examiner*—Dwayne C. Jones
*Attorney, Agent, or Firm*—Millen, White, Zelano, & Branigan

[57] ABSTRACT

A description is given of an improved process for the production of esters from fatty substances having a natural origin (animal and vegetable oils) and low molecular weight alcohols, in which the soaps and oily compounds entrained in the alkaline phases are recycled by treating them, following acidification and separation, with a fraction of the glycerol phase produced, in the presence of an alkaline catalyst and for forming preferably a triglyceride or a partly substituted glyceride.

This process makes it possible to quantitatively obtain methyl, ethyl, propyl or butyl esters usable as a substitute for gas oil.

23 Claims, No Drawings

IMPROVED PROCESS FOR THE PRODUCTION OF ESTERS FROM FATTY SUBSTANCES HAVING A NATURAL ORIGIN

BACKGROUND OF THE INVENTION

The present invention relates to an improvement to transesterification processes for vegetable or animal oils. It more specifically relates to the use of generally lost or low value oily phases which, after transformation, can be recycled and therefore added to the oil used as the starting product for the production of esters.

The integration of said recycling into conventional processes makes it possible to obtain with a quasi-quantitative yield compared with the oil used, methyl, ethyl, propyl or butyl esters used as bases for lubricants, but also as substitute fuels for gas oil. This surprising integration in no way reduces the quality of the esters obtained.

In theory and in practice, it is known how it is possible to produce esters of fatty substances by reacting a neutral oil and a low molecular weight dry alcohol. The ester molar yield is approximately 97 to 98%. The problem is more difficult in the case of the starting material being an acid oil and/or a hydrated alcohol. The state of the art offers numerous solutions, but none seems to be economically and technically satisfactory if consideration is given to the yields obtained.

The first difficulties are encountered with acid oils. It has been proposed that the acidity be neutralized and, following decanting or centrifuging, reacting the neutralized oil with a dry alcohol in the presence of alkaline catalysts. This is in fact the standard procedure used at present in the oil industry. However, there is not only a loss of the fatty acid, but also an oil fraction entrained by the soaps in the aqueous phase, which fraction can be equivalent in weight to that of the fatty acids. This loss is particularly high with certain palm or coconut oils, for which the acidity sometimes rises up to 10% by weight of acid.

Another way to treat an acid oil for bringing it to a state where it can easily be transformed into ester is to reduce the acidity by physical refining, which is less expensive with regards to entrained products than a neutralization, but is more expensive as regards energy and capital expenditure. Once again the acid weight contained in the oil is lost.

With very acid oils, consideration can be given to the esterification thereof with a low molecular weight alcohol in the presence of an acid catalyst. The catalyst is either a soluble acid, or an ion exchange resin. However, in order to obtain an oil with only slight acidity, it is also necessary to eliminate the condensation water resulting from the action of the alcohol on the fatty acid. To eliminate said water, use is made either of an external dryer which must consequently be regenerated, or a system for the entrainment of the water by the alcohol. This gives rise to the hydration of the alcohol, which can no longer be easily reused, because the traces of water catalyze the saponification of the esters if the oils are esterified with a basic catalyst in the following stage. If this alcohol is used for carrying out the transesterification stage, by no means negligible quantities of the soaps formed are lost.

Another case which is relatively frequently encountered in tropical countries, where the alcohol which is to be used in the transesterification is hydrated, such as is e.g. the case with 96 vol % ethyl alcohol. Here again a procedure has been proposed, which consists of using acid catalysts according to two variants.

The first variant, more particularly described in U.S. Pat. No. 4,652,406, simply brings the oil to the neutral state by the esterification of the free acids. However, this esterification increases in difficulty with the alcohol-supplied water present. Competition takes place between the alcohol and the water and it is not possible to sufficiently reduce the acidity except by using an external dryer or a third solvent.

Although this system leads to a reduction of the losses resulting from the acidity, it is necessary to further reduce those occurring on transesterifying the oil with a basic catalyst. Thus, as generally approximately 90% of the oil has to be converted, the situation is that of a neutral oil which is to be transesterified with a hydrated alcohol. The soap losses are significant.

The second variant, more particularly described in U.S. Pat. No. 4,695,411 consists of carrying out an acid catalysis under more severe conditions, where 80% of the oil is converted into esters. The glycerol formed and decanted entrains most of the water. The ester phase, which is incompletely converted, contains water, alcohol and a large amount of fatty acid. It is possible to carry out esterification by drying the alcohol to reduce the acidity. There is finally a total conversion in the presence of a basic catalyst and a hydrated or non-hydrated alcohol. The difference compared with the previous process where only the fatty acids are esterified, is that only approximately 10 to 15% of the oil remains for conversion into esters. However, the soap losses can be high, e.g. 5 to 8%, when a hydrated alcohol is used.

In the latter case, it would be possible to neutralize the fatty acids present in the ester phase instead of esterifying and also to decant the same, which would avoid the use of an external dryer. However, once again a by no means negligible fraction of the soaps and entrained esters is lost.

Finally, reference is made to a case where use is made of a hydrated alcohol and a basic catalyst in the presence of an acid or non-acid oil. The losses are considerable because the basic catalyst rapidly saponifies the oil. Therefore the soaps are not catalysts at conventional temperatures. Thus, e.g. with a 95 vol. % ethyl alcohol, dry colza oil and 1.5% soda in powder form based on the oil, the ester yield is 83% by weight, whereas theoretically and without loss it would be 105% by weight and 94% at the stoichiometry of the soda, excepting that all the soda is transformed into soap.

Thus, no prior art process would appear to be satisfactory, even those using dry alcohol and neutralized oil, because again there is a 2 to 3% loss. All the other processes lead to even greater losses compared with the theoretical ester yield and they can reach 30% by weight based on the oil.

SUMMARY OF THE INVENTION

It has surprisingly been found that it is possible to obtain quantitative ester yields in all cases where there is a transformation of oil into esters, without having to use sophisticated technology. According to the invention addition takes place to the known conventional stages for the production of esters of fatty substances from oil and low molecular weight alcohol, a stage of recycling all the fatty substances entrained in the glycerol phase, the ester, the wash waters and/or the neutralization pastes. Recycling is possible as a result of a transformation of these fatty substances into glycerides, preferably triglycerides, which makes it possible to add them to the starting oil and therefore recycle them. This transformation is simple and does not make use of any new reagent.

Thus, the fatty acids and esters and/or the fatty acids and oil obtained after acidification of the soaps are reacted with all or part of the glycerol under conditions such that the acidity disappears and a mixture of glycerides forms. The reaction is illustrated by the following equation:

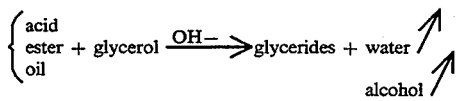

The fatty substance and fatty acid phase is separated after acidification either from the neutralization pastes or the basic glycerol obtained with all processes using a basic catalyst, or by acidification of the soaps formed by neutralizing the ester+fatty acid fraction from an acid catalysis, or the fatty substances entrained in the wash waters of the esters.

Compared with other fatty acid recycling processes which could use an acid catalyst, the present process is advantageous for two reasons. With an acid catalyst the maximum temperatures cannot exceed 120° C., because there is a risk of the formation of polyglycerols and also of the dimerization of the fatty acids. In addition, the fatty acid fraction obtained after acidification of the soaps must be carefully washed to eliminate the slightest trace of alkali. Finally, introduction takes place of an acid catalyst which must then be eliminated and the containers used must resist the corrosion of a system functioning at 120° to 130° C. Finally, the reaction is slow and is easily blocked prior to its completion.

The system consisting of reacting a fatty acid and/or an oil or an ester with glycerol in the presence of an alkaline catalyst according to the invention has an advantage compared with acid catalysis processes, because it is possible to heat without difficulty the glycerol in the presence of alkali, provided that a temperature of 230° C. is not exceeded. Thus, the reaction takes place at between 165° and 230° C., where a soap or any weak acid salt and alkali metal or alkaline earth cation are condensation catalysts of glycerol and a fatty acid or glycerol with an ester.

The water and alcohol which have formed or which are present at the outset can be easily eliminated provided that a distillation column is provided with a minimum number of trays and a condenser.

There are numerous cases where it is possible to use the soap recycling according to the invention. With acid catalysis or basic catalysis processes, reference can be made to the following average ester gains:

| | |
|---|---|
| dry alcohol + neutral oil | 2 to 3% gain |
| dry alcohol + acid oil | 5 to 8% gain |
| hydrated alcohol + neutral oil | 10 to 30% gain |
| hydrated alcohol + acid oil (acid + basic catalyst) | gain can be 5 to 10% |

On all occasions, the total ester yield with this recycling is virtually quantitative. The characteristics of the esters obtained are the same as the best possible characteristics obtainable with a lower yield, in the absence of the recycling according to the invention.

In summarizing, the performance of the process consists of carrying out the conventional transesterification according to a known process. All the aqueous, glycerol phases or neutralization pastes are combined and acidified. Fatty acid and neutral fatty substances are separated from the glycerol or water and are reacted with part of the glycerol.

The catalyst of said reaction is taken either from part of the non-neutralized glycerol, i.e. it is basic, or from the ester wash waters if they are alkaline, or from bases or basic salts, such as alkaline carbonate, introduced subsequently into the mixture. It is important that the medium is basic. At a certain temperature and after a certain time, as a function of the reagents introduced, a glyceride is obtained, whose acidity is low and which is added with or without washing or filtration to the oil used as the starting material.

Although each of the stages is known, the prior art has never suggested recycling with said system the alkaline phases of the transesterification processes using as catalysts a soap or an alkaline base introduced afterwards, said catalysts making it possible to condense the glycerol with an acid as from 170° C. and without any problem.

The interest of this glyceride synthesis is also that the recycled volume is low compared with the initially used oil. In the favorable case of neutral oils and a dry alcohol, it is possible to obtain a quantitative yield by recycling only every 20 to 30 batches the soaps in a reactor, whose volume would be equivalent to that for the main transformation. Thus, it is possible to use a reactor which is roughly 25 times smaller than the main reactor for recycling the soaps, if recycling takes place at the end of each operation.

The following are the specific conditions for obtaining this transformation or conversion of fatty acid or esters into glycerides:

- the glycerol/fatty acid+ester molar ratio must be preferably at least equal to ⅓, higher ratios, e.g. ½ to 1 being possible but not necessary,
- with a ratio of ⅓ triglyceride is in principle obtained, whereas with the other ratios glyceride mixtures are obtained,
- at the outset the catalyst is a fraction of the soaps or bases present in the glycerol, or soda, potash or an alkoxide, or even a strong base and weak acid salt. It is possible to use as the catalyst any alkali metal or alkaline earth metal which is basic, examples being lime, baryta, magnesia and all the already mentioned alkaline compounds,
- the concentrations of catalysts calculated as a percent of soda based on the sum of the fatty acid+esters are 0.1 to 1%, preferably 0.2 to 0.4%.

A certain content of water or alcohol in the reagents is not prejudicial, provided that they are evaporated prior to condensation.

The glycerol is advantageously that obtained directly after the main transesterification reaction in a basic medium and decanting and which consequently contains the soaps. This glycerol is sometimes partly used, most being acidified for separating the fatty acids. It is also possible to acidify all the glycerol phase and aqueous washing phase of the esters and add an alkaline compound after mixing the fatty acids and part of said glycerol, which consequently contains the mineral salts or organic salts.

The acids used in the neutralization of the glycerol or neutralization pastes, or both of them, are the standard mineral acids, such as hydrochloric, sulphuric or phosphoric acid, or organic acids such as acetic, citric or lactic acid.

As the condensation reaction gives off water and alcohol, it is generally necessary to condense the alcohol and water. The reaction can be performed in a falling film or thin film evaporator, which is an ideal system for eliminating an alcohol or water. The minimum temperature is 165° C. The reaction can easily take place between 165° and 230° C. and it is generally sufficient to operate at 200° C.

The aim is to achieve in the mixture an acidity of approximately 2 to 5%, expressed as oleic acid. This acidity is low, if it is borne in mind that to the oil is added only 2 to 20% glyceride in pure oil.

It is particularly important to eliminate all the strong acidity in the fatty acid-glycerol mixture prior to heating, otherwise the glycerol may be decomposed into acrolein. Sometimes it is possible to add the glyceride to the crude oil instead of to the neutral oil, which makes it possible to partly bleach the glyceride on carrying out a treatment on bleaching clay. The crude oil often undergoes a demucilagenation and a filtration on clay.

The non-integrated diagram is in general as follows:

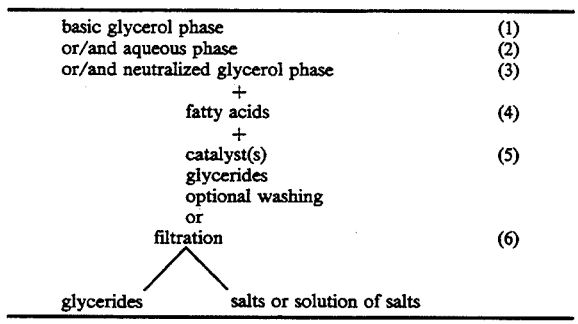

(1) Basic glycerol obtained in the transesterification processes of oils sometimes partly usable as a source of catalyst and glycerol.
(2) Aqueous phase obtained from the neutralization pastes, the ester washing or neutralization of the esters.
(3) Neutralized phase of glycerol.
(4) Fatty acids coming from all the aforementioned phases following neutralization.
(5) Alkali metal or alkaline earth catalysts, which are added or already present in the phases used.

It is preferable not to wash, but instead filter the salts of the sulphate or chloride or even acetate types.

Condensation can take place in a continuous system, e.g. in a falling film evaporator.

The following examples illustrate the invention but in no way limit its scope. Example 5 is given for comparison purposes.

EXAMPLES

Example 1

1000 g of 0.2% oleic acidity colza oil, 250 g of dry methanol and soda (4 g diluted in alcohol) are reacted. Two phases are obtained after one hour. The glycerol phase and the ester phase are separated. After purifying the ester phase 970 g of dry ester are obtained with a purity of 98%.

95% of the glycerol phase are mixed with the aqueous ester washing phase and neutralized with sulphuric acid. The sodium sulphate is filtered and the alcohol evaporated. The fatty acids also containing entrained ester are separated and this phase is reacted with the non-neutralized glycerol phase. After condensing the water and the alcohol, after two hours at 200° C. a weight yield of 32 g of glyceride is obtained and this is added to the following batch. The acidity of the glyceride is 3.2%.

The characteristics of the ester obtained by the action of methanol on the "starting oil+glyceride" mixture formed are as follows:

| | |
|---|---|
| density | 880 |
| flash point | 185° C. |
| neutralization number | 0.5 mg KOH/g |
| flow point | −12° C. |
| filtrability limit temperature (FLT) | −18° C. |
| methyl ester content | >98% |
| total glycerol level (free and attached). | <0.3% |

Example 2

The same example is repeated with a 1.2% oleic acidity colza oil and 5 g of catalyst. Two phases are obtained after 90 minutes. The purified ester weighs 961 g. The glycerol phase is neutralized with hydrochloric acid following the addition of the aqueous ester washing phases. 5% of the glycerol phase is reacted with the separated fatty acid and 0.1 g of soda is added. After 3 hours at 200° C., the acidity is 5.8%. The glyceride weighs 43 g. This acidity scarcely contributes to the total acidity, because it only adds 0.2%. The final ester yield is 99.9%, based on the oil.

Example 3

400 g of a slightly acid colza oil, 100 g of a glyceride mixture with an acidity of 2.9%, 125 g of dry methyl alcohol and 2.7 g of soda dissolved in alcohol are mixed. After purifying the ester, 485 g of ester are obtained with a purity of 97.5% and containing 0.45% monoglyceride, the remainder being a mixture of sterol esters and diglycerides. Thus, the losses corresponding to 10 batches are recycled.

Example 4

As in example 1, the reaction takes place with a methanol having 1% water. After recycling the acid phases, the ester yield after adding glycerides is 99.8% The real yield of the first transesterification reaction without recycling was only 95% ester.

Example 5 (counter-example)

15 g of glycerol, 100 g of fatty acid and 0.5 g of sulphonic acid are heated at 110° C. After 3 hours the acidity is still 35% and would appear to be blocked.

Example 6

Using a neutral sunflower seed oil and a 95% ethyl alcohol, 83.3% of ester are obtained from 1000 g of oil in a basic catalysis. After recovery of the acid phase and reaction with the neutralized glycerol and non-neutralized glycerol supplying the catalyst, at 200° C. 185 g of glyceride are obtained, whereof the acidity is 2.37% after 3 hours at 200° C.

The total weight recovered is 838 g+185 g=1023 g. Theoretically, it would be possible to have 1050 g of esters.

As a result of this recycling, it is possible to produce an ester with an aqueous alcohol under relatively small scale conditions.

Example 7

Using 1000 g of a 7% acidity palm oil, addition takes place of 300 g of methanol and 1.2% soda diluted in alcohol. The ester phase contains 860 g of methyl esters after drying. The fatty acids taken from the glycerol phase after acidification with hydrochloric acid are reacted with 20% of the neutralized evaporated glycerol and 0.5 g of soda. More than 130 g of glyceride is obtained.

Example 8

The fatty acids from a neutralization paste not containing phospholipids are reacted with the fatty acids from a basic glycerol obtained from a transesterification and the neutralized glycerol obtained from said same transesterification. 0.2% potash is added and heating takes place at 200° C. A weakly acid glyceride is obtained, which can be added to the neutralized colza oil. In this way, not only are the losses due to the transesterification reaction, but also those of the neutralization pastes are made good.

It is necessary to avoid an excessive phosphorus concentration in the addition products to ensure that it does not appear in the esters.

We claim:

1. In a process for the production of esters from animal or vegetable oils and low molecular weight alcohols, wherein soaps and oily compounds entrained in an alkaline phase are subjected to acidification and separation, the improvement comprising recycling resultant acidified and separated compounds with a fraction of a glycerol phase produced in the process in the presence of an alkaline catalyst to form a glyceride.

2. A process according to claim 1, wherein the glycerol/fatty acids and esters molar ratio is at least 1:3.

3. A process according to claim 1, wherein the reaction temperature is 165° to 230° C.

4. A process according to claim 1 wherein the catalyst is a basic glycerol fraction.

5. A process according to claim 1 wherein the soaps present in the glycerol, the neutralization pastes or the soaps present in the aqueous ester washing phase or the soaps formed in the neutralized acid esters are recycled.

6. A process according to claim 5, wherein the glyceride is filtered or washed before being added to the oil.

7. A process according to claim 5, wherein the glyceride is before being added to the oil after demucilagenation.

8. A process according to claim 1 wherein the glyceride formed is added to the starting oil.

9. In a process for the production of esters from vegetable or animal oils and low molecular weight alcohols, said process comprising
 (a) transesterifying at least one vegetable or animal oil by means of a low molecular weight alcohol, thus producing a phase containing the esters and a glycerol phase; and
 (b) separating both phases, wherein at least one alkaline phase containing soaps, alkalis and optionally oils or esters entrained, is produced in at least one step of the process,
the improvement comprising
 (c) acidifying said at least one alkaline phase, thus transforming said soaps to the corresponding fatty acids and neutralizing the alkali present;
 (d) separating said fatty acids and/or oils or esters present in said phase;
 (e) heating said fatty acids, oils or esters in the presence of a suitable fraction of the glycerol phase separated in (b) and in the presence of an alkaline catalyst, so that a mixture is formed which contains a triglyceride and optionally at least one mono- or di-glyceride of said fatty acids; and
 (f) recycling said mixture to the transesterification (a).

10. A process according to claim 9, wherein transesterifying (a) is effected in the presence of a basic catalyst and said alkaline phase treated in (c) is comprised at least of a part of the glycerol phase separated in (b).

11. A process according to claim 10, wherein the alkaline catalyst used in (e) comprises a fraction of said glycerol phase separated in step (b).

12. A process according to claim 9, wherein the starting vegetable or animal oil is acid and previously refined by neutralizing with an alkaline base, whereby neutralization pastes are produced and separated, and said alkaline phase treated in (c) comprises neutralization pastes.

13. A process according to claim 9, comprising transesterifying (a) by means of basic catalysis and washing with water the phase containing the esters obtained, wherein said alkaline phase treated in (c) comprises the wash water of the phase containing the esters.

14. A process according to claim 13, wherein the alkaline catalyst used in (e) comprises a fraction of the water after washing the phase containing the esters.

15. A process according to claim 9, comprising transesterifying (a) by means of acid catalysis followed with a neutralization of the acid esters, yielding neutralized acid esters which are water-washed, said alkaline phase treated in (c) comprises the wash water of the neutralized acid esters.

16. A process according to claim 9, comprising, in (e), using a proportion of the glycerol phase corresponding to a molar ratio glycerol/(fatty acids and esters) of at least 1:3.

17. A process according to claim 9, comprising operating (e) at 165°–230° C.

18. A process according to claim 9, wherein the alkaline catalyst used in (e) comprises a base or a basic salt introduced as such.

19. A process according to claim 9, wherein in (e), the concentration of the alkaline catalyst, expressed as a percent of soda with respect to the sum of the fatty acids and esters is from 0.1 to 1% by weight.

20. A process according to claim 9, further comprising demucilagenating the starting oil before recycling to it the glyceride mixture in (f).

21. A process according to claim 9, wherein the glyceride mixture is recycled to the crude starting oil in (f).

22. A process according to claim 9, further comprising filtering and/or washing the glyceride mixture before recycling it to the starting oil in (f).

23. A process according to claim 9, wherein the low molecular weight alcohol is methanol, ethanol, a propanol, or a butanol.

* * * * *